UNITED STATES PATENT OFFICE.

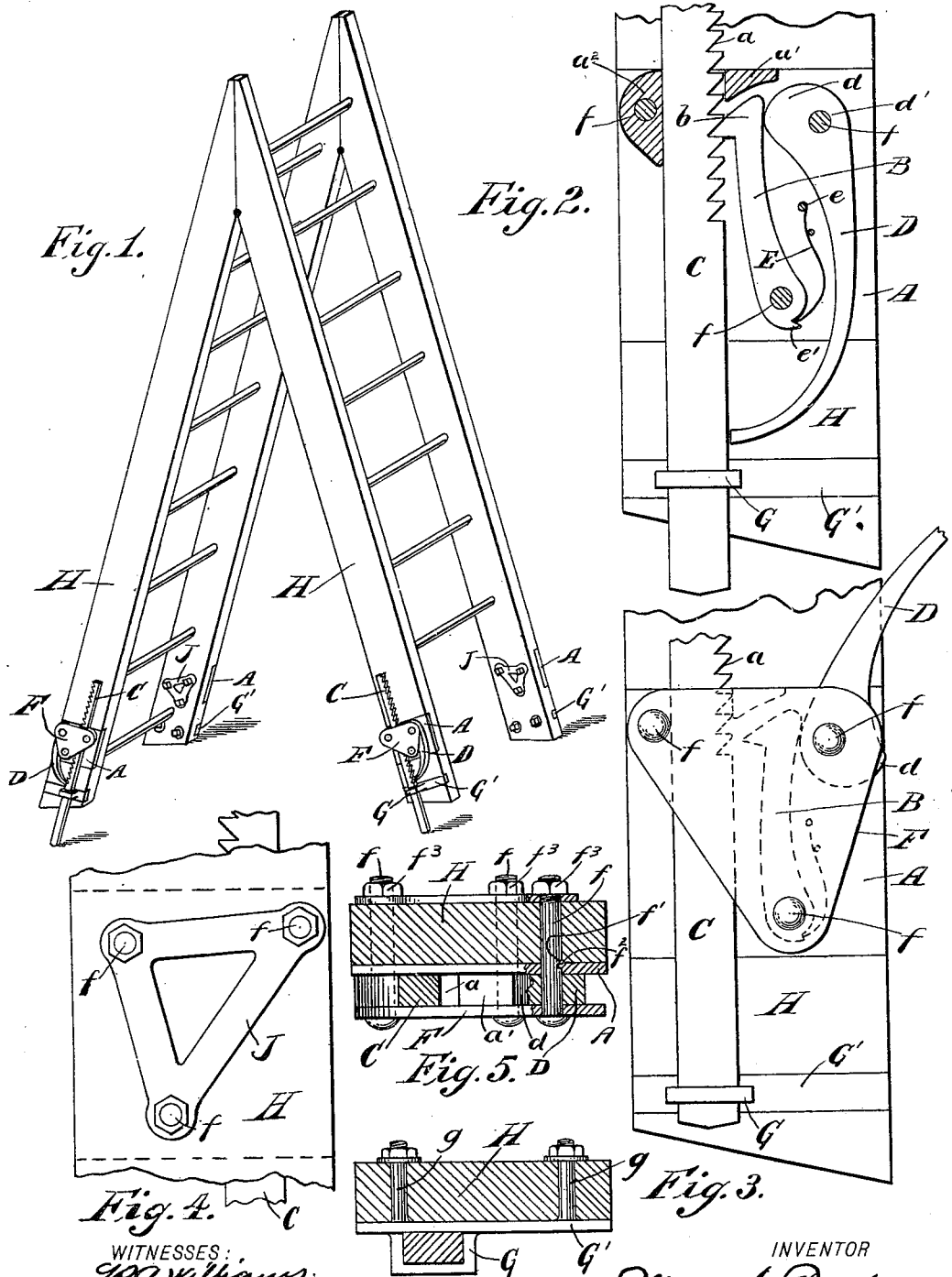

MAX ANTHONY BAETZ, OF ASBURY PARK, NEW JERSEY.

LEVELING ATTACHMENT FOR STEP-LADDERS.

SPECIFICATION forming part of Letters Patent No. 644,567, dated March 6, 1900.

Application filed August 10, 1899. Serial No. 726,738. (No model.)

*To all whom it may concern:*

Be it known that I, MAX ANTHONY BAETZ, a citizen of the United States, and a resident of Asbury Park, county of Monmouth, and State of New Jersey, have invented certain new and useful Improvements in Leveling Attachments for Step-Ladders, of which the following is a specification, reference being had to the accompanying drawings, forming a part thereof, in which similar letters of reference indicate corresponding parts.

My invention relates to an improved adjustable leveling attachment for step-ladders and the like, and has for its object to provide a device which when attached to the lower ends of the sides of a step-ladder affords a means for leveling the same when placed upon uneven ground. I attain this object by the device illustrated in the accompanying drawings, in which—

Figure 1 is a perspective view of a step-ladder with my device attached. Fig. 2 is an enlarged view of the device with front plate removed. Fig. 3 is a view of the device with plate complete and shows by dotted lines the mechanism disengaged to allow the extension-rod to be adjusted. Fig. 4 is a side view showing the method of fastening the device to the side of a step-ladder. Fig. 5 is a top view of my device shown partly in section, and Fig. 6 is a view showing the lower guide-piece.

Similar letters of reference refer to similar parts.

In the practice of my invention I provide a plate A, upon which I mount a pawl B, which engages in the teeth $a$ upon an extension-rod C. The said extension-rod C moves upon the plate A between the projections $a'$ and $a^2$, formed upon the said plate A. An arm D, having an eccentric end $d$, is mounted upon the plate A at $d'$. The eccentric end $d$ engages against the upper end $b$ of the pawl B. A spring E is mounted on the plate A at $e$, the free end of the spring E engaging against the lower end $e'$ of the pawl B.

The plate F is fastened to the aforesaid plate A by means of the bolts $f$. The said plate F is employed to keep the mechanism in position and act as a covering for the same.

The lower end of the extension-rod C moves in the guide G, formed upon the base-piece G'. The said base-piece G' is fastened to the side of the ladder H by means of the bolts $g$, formed upon the said base-piece G'.

The bolts $f$ are provided with small indentations $f'$, and in assembling the different parts of my device a lip or tongue $f^2$ is formed upon the plate A by forcing a part of said plate into the indentation $f'$. This acts to hold the parts together. The bolts $f$ also afford means for fastening my device to the side of a step-ladder. The bolts pass through the side of the step-ladder, and the plate or washer J is put on over the ends of the bolts $f$ and the nuts $f^3$ are fastened in position against the plate J.

Fig. 2 shows the extension-rod locked in position. To adjust or change the position of the extension-rod C, the arm D is pulled back, allowing the pawl B to disengage itself from the teeth $a$ on the rod C, as shown by dotted lines in Fig. 3. The rod may then be moved up and down as far as desired and when properly set is locked in position again by bringing the arm D down, thereby forcing the pawl to again engage with the teeth $a$.

This device is not limited in its use to step-ladders, but may be used upon any portable piece of furniture, such as scaffolds, tables, platforms, &c.

Having thus described my invention, what I claim as new, and desire to secure by Letters Patent, is—

1. The combination in an adjustable leveling attachment of front and back plates, an extension-rod provided with ratchet-teeth and movable between said front and back plates, a pawl mounted between said front and back plates and adapted to engage in said ratchet-teeth upon said rod and employed as a means for locking the said rod in position, an arm pivotally mounted between the aforesaid plates and formed with an eccentric end which engages against the pawl and is employed to engage and disengage the said pawl and the aforesaid ratchet-teeth upon the said rod, and a spring also mounted between the aforesaid plates and securely fastened at one end, the free end engaging against the lower end of the pawl and adapted to normally keep the pawl in contact with the eccentric end of the aforesaid arm, substantially as described.

2. The combination in an adjustable leveling attachment of front and back plates, an extension-rod provided with ratchet-teeth and movable between said front and back plates, projections formed upon the said back plate and acting as a guide for the extension-rod to move in, a pawl mounted between said front and back plates and adapted to engage in said ratchet-teeth upon the said rod and employed in conjunction with an operating-arm to securely lock said pawl and rod in position, an arm pivotally mounted between the aforesaid plates and formed with an eccentric end which engages against the pawl and is employed to operate the said pawl, a spring also mounted between the aforesaid plates and securely fastened at one end, the free end engaging against the lower end of the pawl and adapted to normally keep the pawl in contact with the eccentric end of the aforesaid arm, and a guide-piece fastened to side of step-ladder and formed to allow the lower end of said extension-rod to move in it, substantially as described.

3. The combination in an adjustable leveling attachment, of an extension-rod movable in and held between a front and back plate, said extension-rod provided with ratchet-teeth, a pawl and operating-arm mounted between the said plates and employed to lock the extension-rod in position, a spring also mounted between the said plates and engaging against the lower end of said pawl, attaching-bolts extending through the device and adapted to hold the mechanism together and afford a means for fastening the side of the step-ladder, and a plate or washer adapted to be fastened against the side of the step-ladder under fastening-nuts, substantially as described.

In testimony that I claim the foregoing as my invention I have signed my name, in presence of two witnesses, this 4th day of August, 1899.

MAX ANTHONY BAETZ. [L. S.]

Witnesses:
ADAM SCHMITT,
JESSE MOON.